United States Patent
Kawabe

(10) Patent No.: US 8,055,908 B2
(45) Date of Patent: Nov. 8, 2011

(54) DATA TRANSMISSION METHOD AND ELECTRONIC DEVICE USING THE SAME

(75) Inventor: Shigeru Kawabe, Tokyo (JP)

(73) Assignee: NEC Personal Products, Ltd. (JP)

( * ) Notice: Subject to any disclaimer, the term of this patent is extended or adjusted under 35 U.S.C. 154(b) by 957 days.

(21) Appl. No.: 11/391,030

(22) Filed: Mar. 28, 2006

(65) Prior Publication Data

US 2006/0218314 A1    Sep. 28, 2006

(30) Foreign Application Priority Data

Mar. 28, 2005   (JP) ................................. 2005-092263

(51) Int. Cl.
*G06F 21/00* (2006.01)

(52) U.S. Cl. ........ 713/189; 713/190; 713/191; 713/192; 713/193; 713/194

(58) Field of Classification Search ........... 713/189–194
See application file for complete search history.

(56) References Cited

U.S. PATENT DOCUMENTS

| | | | |
|---|---|---|---|
| 3,924,240 A * | 12/1975 | Given | 710/107 |
| 3,956,615 A * | 5/1976 | Anderson et al. | 705/72 |
| 5,081,675 A * | 1/1992 | Kittirutsunetorn | 713/190 |
| 5,128,996 A * | 7/1992 | Rosenow et al. | 713/192 |
| 5,548,648 A * | 8/1996 | Yorke-Smith | 713/193 |

FOREIGN PATENT DOCUMENTS

| | | |
|---|---|---|
| JP | 11-238034 | 8/1999 |
| JP | 2000-207234 | 7/2000 |
| JP | 2001-203752 | 7/2001 |
| JP | 2002-027018 | 1/2002 |
| JP | 2003-225023 | 8/2003 |
| JP | 2004-109177 | 4/2004 |
| JP | 2004-234526 | 8/2004 |

OTHER PUBLICATIONS

Japanese Office Action dated Oct. 1, 2008 (with English translation of the relevant parts).

* cited by examiner

*Primary Examiner* — Vivek Srivastava
*Assistant Examiner* — Helai Salehi
(74) *Attorney, Agent, or Firm* — Ostrolenk Faber LLP

(57) ABSTRACT

A data transmission method is achieved by transmitting a contents data transmission request from a host device to a module; by dividing a first contents data into a plurality of blocks in the module; by transmitting the plurality of blocks from the module to the host device; and by combining the plurality of blocks to produce a second contents data. A plurality of data buses are used for the transmission of the contents data transmission request and the plurality of blocks.

16 Claims, 3 Drawing Sheets

DATA TRANSMISSION METHOD AND ELECTRONIC DEVICE USING THE SAME

BACKGROUND OF THE INVENTION

1. Field of the Invention

The present invention relates to data transmission in an electronic device. Particularly, the present invention relates to a data transmission method and an electronic device in which a host device and a module carry out the data transmission method.

2. Description of the Related Art

In a digital broadcasting television set and a personal computer, it is necessary to protect the contents from illegal copy. For this purpose, it is general to employ a method of encrypting the contents by use of a specific key, as described in Japanese Laid Open Patent publication (JP-P2004-109177A).

However, even implementation of dedicated hardware and software for encryption, there still remains a risk that the contents are copied and decrypted when a general-purpose bus that is officially standardized is used. In the general-purpose bus, terminal numbers for data transmission and reception are defined. Accordingly, if data transmitted on a line between the terminals related to the data transmission is recorded, the data could be decrypted and copied by trying various decryption methods.

Through the spread of the digital broadcasting television, it would be anticipated that enhancement of contents data protection is indispensable. Thus, electronic devices such as a personal computer, a video recorder, a PDA (Personal Digital Assistance), and a mobile terminal having a function of receiving the contents data are required to have a function of preventing copy of the contents data.

As described above, the copy of the contents data is often carried out by recording a data packet stream flowing through the general-purpose bus. Therefore, one countermeasure is to use a special bus that is not the general-purpose bus. However, this causes heavy loads in terms of development and maintenance of the electronic device.

SUMMARY OF THE INVENTION

An object of the present invention is to provide a data transmission method and an electric device using the same, in which contents data can be prevented from being copied.

In an aspect of the present invention, a data transmission method is achieved by transmitting a contents data transmission request from a host device to a module; by dividing a first contents data into a plurality of blocks in the module; by transmitting the plurality of blocks from the module to the host device; and by combining the plurality of blocks to produce a second contents data. A plurality of data buses are used for the transmission of the contents data transmission request and the plurality of blocks.

Here, the transmitting the plurality of blocks may be achieved by transmitting the plurality of blocks from the module to the host device through the plurality of buses in parallel.

Also, the transmitting the plurality of blocks may be achieved by transmitting a first half of the plurality of blocks from the module to the host device through one of the plurality of buses; and by transmitting a second half of the plurality of blocks from the module to the host device through another of the plurality of buses after the transmission of the first half.

Also, the transmitting the plurality of blocks may be achieved by transmitting the plurality of blocks from the module to the host device through one of the plurality of buses.

Also, the transmitting a contents data transmission request may be achieved by transmitting a first contents data transmission request from the host device to the module prior to the transmission of the first half; and by transmitting a second contents data transmission request from the host device to the module prior to the transmission of the second half.

Also, the transmission method may be achieved by further encrypting a contents data by using a first key in the module to produce the first contents data; and decrypting the second contents data by using a second key to produce a replica of the contents data.

In this case, the data transmission method may be achieved by further transmitting a key request containing a third key from the host device to the module; encrypting the first key by using the third key to produce an encrypted key; transmitting the encrypted key from the module to the host device; and decrypting the encrypted key by using the third key to produce the second key.

In this case, the contents data transmission request and the key request may be transmitted from the host device to the module by use of different ones of the plurality of buses.

Also, the first contents data transmission request and the second contents data transmission request may be transmitted from the host device to the module by use of different ones of the plurality of buses.

In another aspect of the present invention, an electronic device includes a module having a first contents data storage section in which a first contents data is stored; a host device having a second contents data storage section in which the first contents data transmitted from the module is stored as a second contents data; and a plurality of buses provided to connect the module and the host device. The plurality of data buses are used for transmission of a contents data transmission request and a plurality of blocks of the first contents data Here, the host device may transmit the contents data transmission request to the module. The module may divide the first contents data into a plurality of blocks in response to the contents data transmission request and transmit the plurality of blocks to the host device. The host device may combine the plurality of blocks to produce the second contents data.

Also, the module may transmit the plurality of blocks to the host device through the plurality of buses in parallel.

Also, the module may transmit a first half of the plurality of blocks from the module to the host device through one of the plurality of buses, and transmit a second half of the plurality of blocks from the module to the host device through another of the plurality of buses after the transmission of the first half.

Also, the module may transmit the plurality of blocks to the host device through one of the plurality of buses.

Also, the host device may transmit a first contents data transmission request to the module prior to the transmission of the first half, and transmit a second contents data transmission request to the module prior to the transmission of the second half.

Also, the module may further include a third contents data storage section configured to store a contents data; and an encrypting unit configured to encrypt the contents data by using a first key to store the first contents data in the first contents data storage section. Also, the host device may further include a fourth contents data storage section configured to store a replica of the contents data; and a decrypting unit configured to decrypt the second contents data by using a second key to store the replica of the contents data in the fourth contents data storage section.

Also, the host device may transmit a key request containing a third key to the module. The module may encrypt the first key by using the third key to produce an encrypted key, and transmits the encrypted key to the host device. The host device may decrypt the encrypted key by using the third key to produce the second key.

Also, the contents data transmission request and the key request may be transmitted from the host device to the module by use of different ones of the plurality of buses.

Also, the first contents data transmission request and the second contents data transmission request may be transmitted from the host device to the module by use of different ones of the plurality of buses.

DESCRIPTION OF THE PREFERRED EMBODIMENTS

Hereinafter, a data transmission method of the present invention will be described with reference to the attached drawings.

First Embodiment

Figure 1:
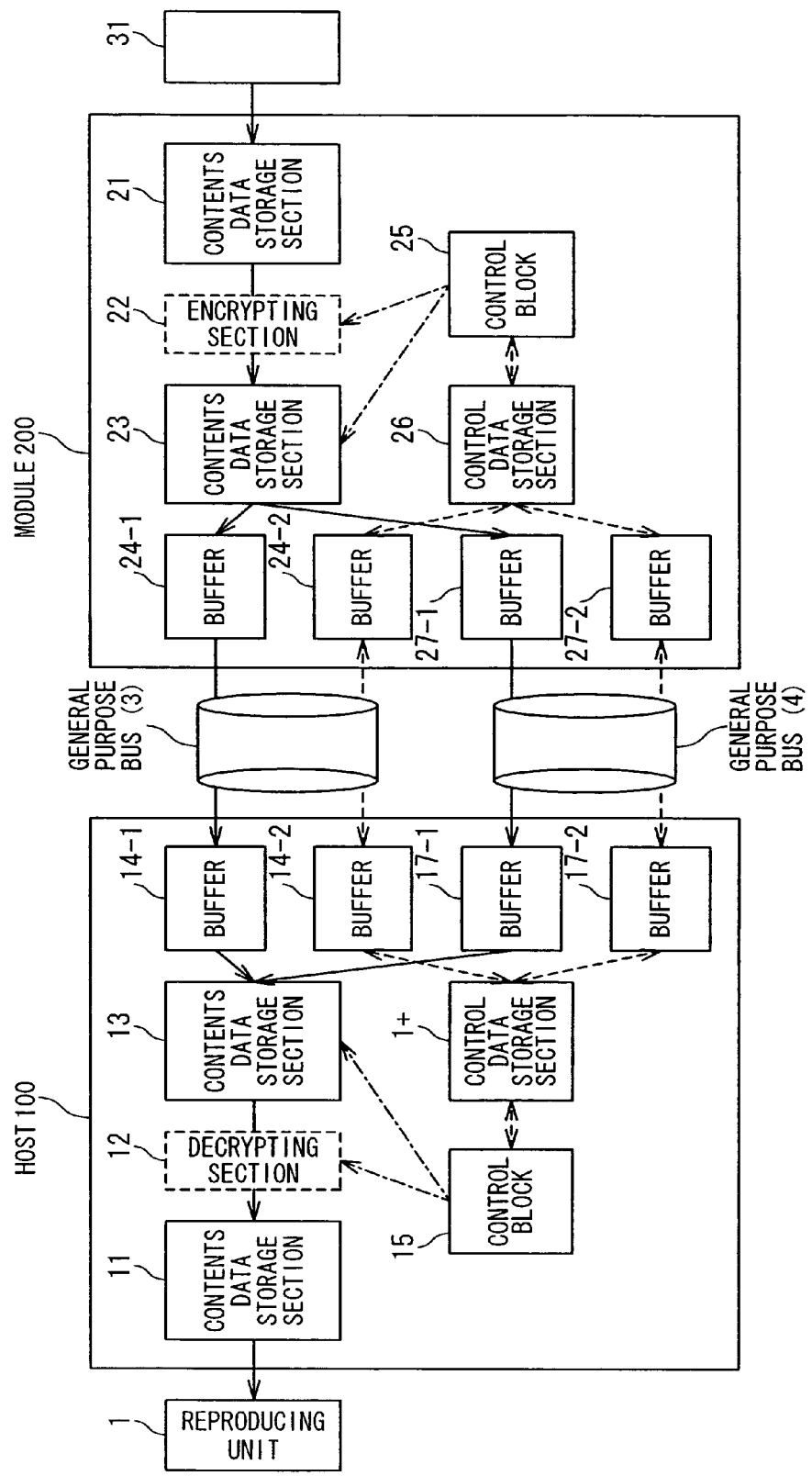
FIG. 1 is a block diagram showing the configuration of an electronic device to which a data transmission method of the present invention is applied.

FIG. 1 is a block diagram showing the configuration of an electronic device with a system to which the data transmission method according to the first embodiment of the present invention is applied. Referring to FIG. 1, the electronic device in the first embodiment includes a TV tuner 31, a module 200, a host device 100, and a contents reproducing unit 1. The host device 100 and the module 200 are connected by general-purpose buses 3 and 4. The TV tuner 31 receives a contents data transmitted in digital broadcasting. The module 200 receives the contents data sent from the TV tuner 31. The host device 100 receives the contents data from the module 200 through the two general-purpose buses 3 and 4. The contents reproducing unit 1 reproduces the contents data supplied from the host device 100.

It should be noted that the electronic device shown in FIG. 1 may be a personal computer, a video recorder, a PDA, a mobile terminal, or the like, in which all units may be accommodated in a single housing. Also, in this example, an interface is used called an "ExpressCard" which is for the personal computer, and which includes two general-purpose buses of PCI Express and USB (Universal Serial Bus). However, the present invention is not limited to this interface. However, it is desirable to use two general-purpose buses that are not mutually compatible, and have different communication bands. Also, as described above, the TV tuner 31 receives the contents data transmitted in digital broadcasting. The present invention is not limited to the TV turner 31 with respect to the reception of the contents data. In the present invention, instead of the TV tuner 31, an input section of the personal computer may be employed to receive the contents data sent from a server through a network, or receiving sections of a PDA and a mobile terminal may be used to receive the contents data from a SIP server, and so on.

The module 200 includes contents data storage sections 21 and 23; an encrypting unit 22; buffers 24-1, 24-2, 27-1, and 27-2; a control block 25 for controlling an operation of each component in the module 200; and a control data storage section 26. The host device 100 includes contents data storage sections 11 and 13; a decrypting unit 12; buffers 14-1, 14-2, 17-1, and 17-2; a control block 15 for controlling an operation of each component in the host device 100; and a control data storage section 16.

The buffers 14-1 and 14-2 of the host device 100 are connected to the buffers 24-1 and 24-2 of the module 200 through the general-purpose bus 3, respectively. The buffers 17-1 and 17-2 of the host device 100 are connected to the buffers 27-1 and 27-2 of the module 200 through the general-purpose bus 4, respectively. The control block 25 transmits a control data (containing an instruction and request) stored in the control data storage section 26 to the buffer 14-2 or 17-2 through the buffer 24-2 or 27-2 and the general-purpose bus 3 or 4. The control block 15 takes out the control data stored in the control data storage section 16 through the buffer 14-2 or 17-2, and executes an operation based on the taken-out control data. Also, the control block 15 transmits a control data stored in the control data storage section 16 to the buffer 24-2 or 27-2 through the buffer 14-2 or 17-2 and the general-purpose bus 3 or 4. The control block 25 takes out the control data stored in the control data storage section 26 through the buffer 24-2 or 27-2, and executes an operation based on the taken-out control data. The control block 25 controls various sections in the module 200 based on the control data stored in the control data storage section 26, and the control block 15 controls various sections in the host device 100 based on the control data stored in the control data storage section 16.

When a contents data should be reproduced, the contents data received by the TV tuner 31 is stored in the contents data storage section 21. The control block 15 transmits a contents data transmission request as the control data from the control data storage section 16 to the control data storage section 26 through the buffer 17-2, the general-purpose bus 4 and the buffer 27-2. The control block 25 takes out the contents data transmission request from the control data storage section 26, and controls the encrypting unit 22 to encrypt the contents data stored in the contents data storage section 21 by using an encryption key. The encrypted contents data is stored in the contents data storage section 23. Then, the control block 25 divides the encrypted contents data stored in the contents data storage section 23 into a plurality of blocks, forms data packets from the plurality of blocks and distributes the data packets in the buffers 24-1 and 27-1 such that the data packets are accumulated therein. The contents data is transmitted from the buffers 24-1 and 27-1 of the module 200 to the buffers 14-1 and 17-1 of the host device 100 through the buses 3 and 4 as the data packets in response to the contents data transmission request. The control block 25 may carry out the division of the contents data, and the distribution and accumulation of the data packets based on a predetermined rule. In addition to the above processes, especially, the control block 25 may carry out an interleaving process. Also, the control block 25 may divide the contents data in units of frames or may divide the contents data for one frame into the blocks.

When the data packets are received, the control block 15 confirms the encryption and division of the contents data.

Subsequently, the control block 15 takes out blocks from the data packets received from the module 200 through the buses 3 and 4 and stored in the buffers 14-1 and 17-1 and combines the blocks to reproduce the encrypted contents data. Subsequently, the control block 15 refers to the control data storage section 16 to obtain a decryption key corresponding to the above encryption key, and controls the decrypting unit 12 to decrypt the encrypted contents data by using the decryption key. Thus, the contents data can be reconfigured. The reconfigured contents data is stored in the contents data storage section 11. Subsequently, the control block 15 outputs the reconfigured contents data to the reproducing unit 1. Thus, the contents data received by the TV tuner 31 can be reproduced by the reproducing unit 1.

In the electronic device in the first embodiment, the contents data is encrypted and divided, and transmitted to the host through different general-purpose buses. Therefore, it is impossible to reproduce the contents data from only a stream of data packets flowing through one of the general-purpose buses.

Second Embodiment

In view of the contents data protection, it is undesirable that an original contents data can be reconfigured directly from the data packets flowed through the general-purpose buses. For this reason, data packets stored in the buffers 24-1 and 27-1 have been encrypted. Thus, the direct reconfiguration of the contents data from the transmitted data packets can be prevented.

Figure 2:
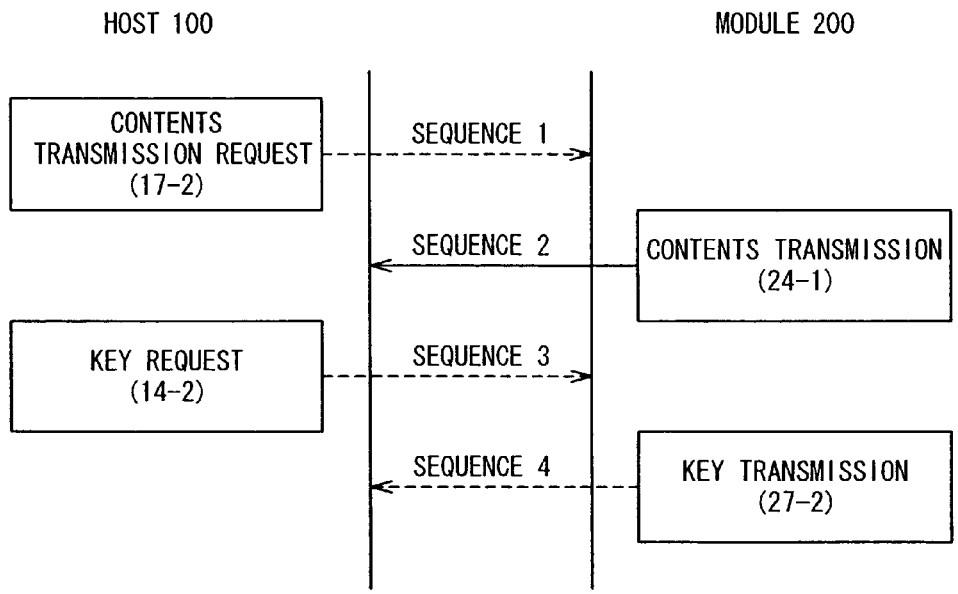
FIG. 2 shows a sequence operation in the data transmission method according to a second embodiment of the present invention.

As shown in FIG. 2, the electronic device in the second embodiment has the same circuit configuration that of the first embodiment. In the first embodiment, the module 200 and the host device 100 have the encryption key and decryption key in advance. However, in the second embodiment, the key is transmitted from the module 200 to the host device 100. That is, after the data packets are received by the buffers 14-1 and 17-1, the control block 15 transmits a key transmission request from the control data storage section 16 to the control data storage section 26 of the module 200 through one of a path of the buffer 14-2, the bus 3 and the buffer 24-2 or a path of the buffer 17-2, the bus 4 and the buffer 27-2. When receiving the key transmission request, the control block 25 encrypts the encryption key by using a key contained in the key transmission request and stores the encrypted key in the control data storage section 26. Then, the control block 25 transmits the encrypted key to the control data storage section 16 through the other path. In this case, the same path as in the transmission of the request may be used. When knowing the reception of the encrypted key, the control block 15 reads out the encrypted key and the key contained in the key transmission request from the control data storage section 16. Then, the control block 15 controls the decrypting unit 12 to decrypt the encrypted key into a decryption key as a non-encrypted key by using the key, and then the control block 15 controls the decrypting unit 12 to decrypt the data stored in the contents data storage section 13. The data decrypted in this way are stored in the contents data storage section 11.

As described above, the host device 100 once accumulates the data packets received from the module 200 in the buffers 14-1 and 17-1, and requests the key generated by the control block 25 to the control block 25 of the module 200. The control block 25 sends the key generated and encrypted by the control block 25 to the control block 15 of the host device 100 in response to the request. In the host device 100, the reconfiguration and decryption of the data packets as the contents data are carried out by using the encrypted key transmitted from the control block 25, and a replica of the original contents data is ultimately generated. The generated replica of the contents data is outputted to the reproducing unit 1, viewing and listening of the contents data become possible.

In the second embodiment, the contents data is encrypted and divided and transmitted to the host device 100 through different general-purpose buses. Therefore, it is impossible to reproduce the contents data from only the data flowed through one of the general-purpose buses. In addition, the key generated on the host device 100 side and the key generated on the module 200 side are necessary at the same for carry outing decryption of the encrypted contents data. In this case, the key used on the module 200 side is transmitted to the host device 100 through one of the general-purpose buses. Therefore, further protection of copy can be achieved.

Third Embodiment

Figure 3:
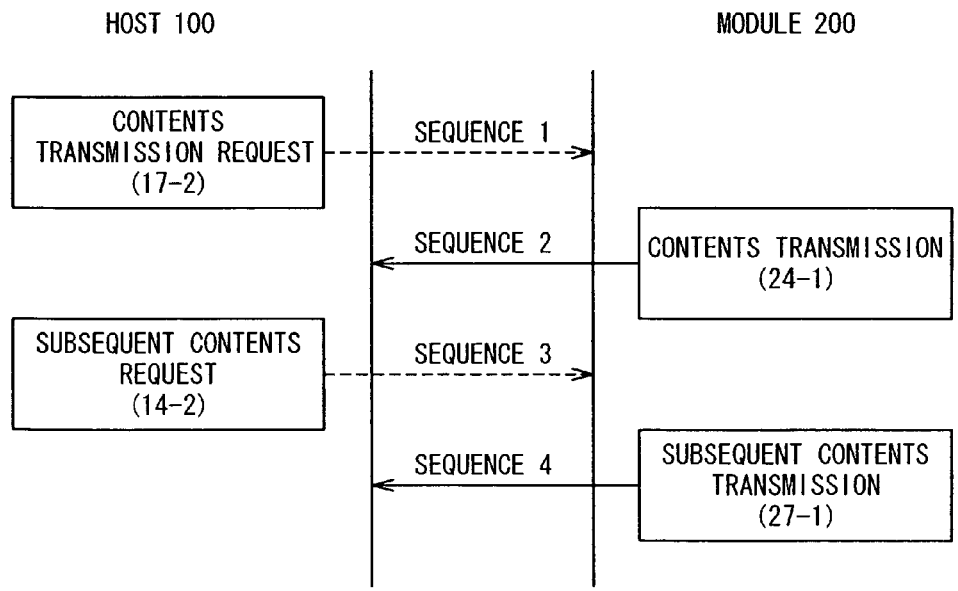
FIG. 3 shows a sequence operation in the data transmission method according to a third or fourth embodiment of the present invention.

Next, the electronic device in the third embodiment of the present invention has the same circuit configuration as that in the first embodiment. The general-purpose buses 3 and 4 can be used simultaneously, but the general-purpose buses 3 and 4 may be used separately. For example, the general-purpose bus 3 may be used for transmission of the contents data and the general-purpose bus 4 may be used for transmission of the control data. FIG. 3 shows a sequence operation when separate use as explained above is employed, and shows the contents data to be transmitted, along with the buffers for transmission and reception.

The contents data transmission request from the host device 100 is sent from the control block 15 to the control block 25 through the buffer 17-2, the bus 4 and the buffer 27-2 (sequence 1). Then, the contents data is transmitted from the module 200 to the host device 100 through the buffer 24-1, and the bus 3 and the buffer 14-1 (sequence 2) in response to the contents data transmission request. In the third embodiment, encryption is carried out in the module 200 as well as in the second embodiment. Therefore, a key request for a decryption key for decrypting the encrypted contents data is transmitted from the host device 100 to the module 200 through the buffer 14-2, the bus 3 and the buffer 24-2 (sequence 3). Then, the decryption key is transmitted from the module 200 to the host device 100 through the buffer 27-2, the bus 4 and the buffer 17-2 (sequence 4) in response to the decryption key request.

In the third embodiment, the division of the contents data is not carried out and only the encryption of the contents data is carried out. The keys on the host device 100 side and the module 200 side are required at the same time for the decryption. For this reason, only the key on the module 200 side is encrypted and transmitted through one of the general-purpose buses through which the contents data is not transmitted. Thus, the copy protection can be achieved. The division is not carried out in the third embodiment. Therefore, the contents data storage section 23 in FIG. 1 required for the division may be omitted. Consequently, it is possible to simplify the configuration of the module 200.

Fourth Embodiment

As described above, in the first embodiment, the contents data is divided in the module 200 in response to the contents data transmission request from the host device 100, and transmitted to the host device 100. However, the transmission of the contents data through the general-purpose buses may be carried out in time divisional manner. FIG. 3 shows a sequence operation when the general purpose buses is used in the time divisional manner, and shows the contents data to be transmitted, along with the buffers for transmission and reception.

As shown in FIG. 3, a first contents data transmission request is transmitted from the control block 15 of the host device 100 to the control block 25 of the module 200 through the buffer 17-2, the bus 4 and the buffer 27-2 (sequence 1). Then, a first half of the contents data is transmitted from the module 200 to the host device 100 through the buffer 24-1, the bus 3 and the buffer 14-1 (sequence 2). Subsequently, a second contents data transmission request is transmitted from the control block 15 of the host device 100 to the control block 25 of the module 200 through the buffer 14-2, the bus 3 and the buffer 24-2 (sequence 3). In response to the request, the second half of the contents data is transmitted from the module 200 to the host device 100 through the buffer 27-1, the bus 4 and the buffer 17-1 (sequence 4).

In the fourth embodiment, the contents data is transmitted through the general-purpose buses different for the first half and second half of the contents data. Thus, the copy protection can be achieved. In the fourth embodiment, a control procedure can be made simple, since the division of the contents data can be accomplished in time divisional manner.

It should be noted that the encryption may be carried out in the module 200 in the fourth embodiment, as in the second and third embodiments. When such configuration is employed, a key request is issued from the host device 100 through the buffer 14-2. In response to the key request, the module 200 transmits the key through the buffer 27-2.

Fifth Embodiment

Figure 4:
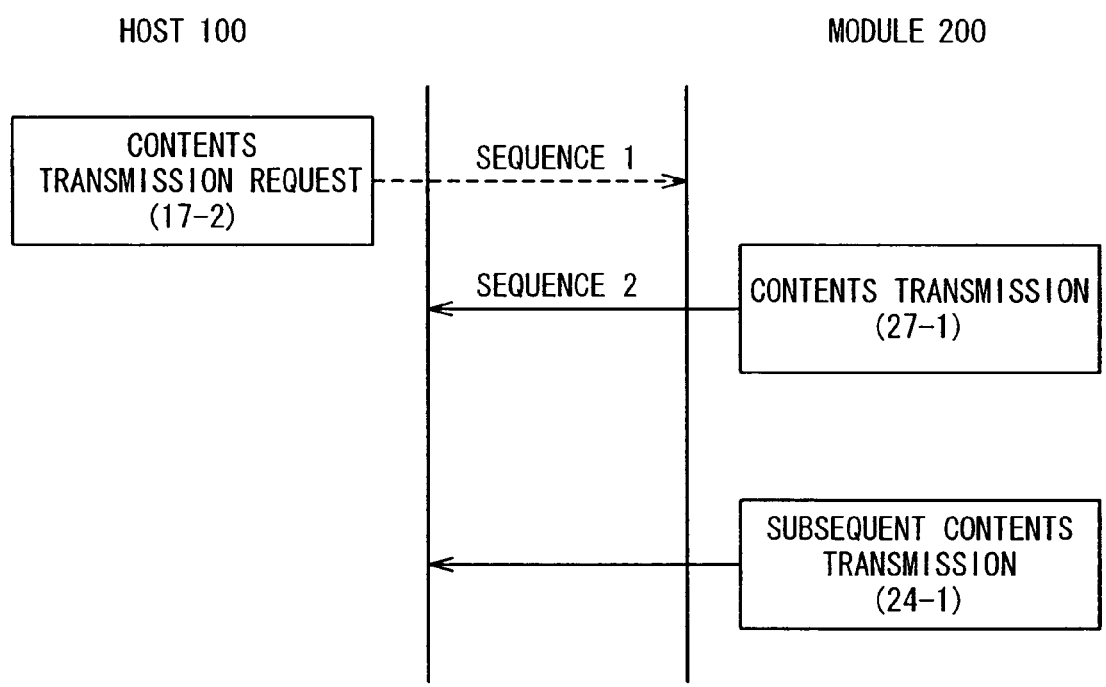
FIG. 4 shows a sequence operation in the data transmission method according to a fifth embodiment of the present invention.

As described above, in the first embodiment, the contents data are divided in the module 200 and transmitted from the buffers 24-1 and 27-1 in response to the contents data transmission request from the host device 100. However, the blocks obtained through the division of the contents data may be transmitted by using the general-purpose buses 3 and 4 simultaneously. FIG. 4 shows a sequence operation when such use of the general-purpose buses is employed, and shows the contents data to be transmitted, along with the buffers for transmission and reception.

As shown in FIG. 4, the contents data transmission request is transmitted from the host device 100 to the module 200 through the buffer 17-2, the bus 4 and the buffer 27-2 (sequence 1). The first half and second half of the contents data are simultaneously transmitted from the module 200 to the host device 100 through the buffers 24-1 and 27-1, the buses 3 and 4, and the buffers 14-1 and 17-1 (sequence 2).

In the fifth embodiment, transmission of the contents data can be promptly carried out, since the transmission of the contents data is carried out simultaneously.

It should be noted that the encryption may be carried out in the module 200 in the fifth embodiment, as in the second and third embodiments. When such configuration is employed, a key request is transmitted from the host device 100 to the module 200 through the buffer 14-2, the bus 3 and the buffer 24-2. In response to the key request, the module 200 transmits the key to the host device 100 through the buffer 27-2, the bus 4 and the buffer 17-2.

In the above description, the number of buses is two in the above embodiments. However, the number of buses may be other plural numbers (three or above), and buffers for transmitting the contents data and the control data are provided in accordance with each bus.

As could be understood, the present invention is applicable to the following fields. That is, (1) A contents storage medium such as an HDD instead of the TV tuner 31;

(2) Since a transfer capacity is increased, a plurality of contents data can be transferred at one time. As a result, it is possible to realize a module in which storage media such as a plurality of tuners and HDDs are combined; and (3) Bidirectional communication can be realized by reversing a flow direction of contents on one bus. Consequently, it is possible to realize a module in which scrambled contents data can be decrypted by using general-purpose buses.

What is claimed is:

1. An electronic equipment, comprising:
a module configured as a transmission side of data;
a host configured as a reception side of the data;
a plurality of buses for data transmission between said module and said host;
a module-side contents data storage section provided in said module to store a content;
a plurality of module-side buffers provided respectively for said plurality of buses;
a module-side control block provided in said module to divide the content data for the content stored in said content data storage section into a plurality of data portions to distribute into said plurality of module-side buffers;
a host-side control information storage section provided for said host to store a host-side key which instructs a processing content of content data;
a module-side control information storage section provided for said module to store the host-side key; and
a host-side control block provided for said host to send a content data transmission request and the host-side key stored in the host-side control information storage section to said module,
wherein said module-side control block is configured to store the host-side key sent with the content data transmission request in said module-side control information storage section, and to perform processing on said content data based on the host-side key to send to said host, and
said host-side control block is configured to receive the plurality of data portions and to re-configure the content data from the plurality of data portions by using the host-side key stored in said host-side control information storage section.

2. The electronic equipment according to claim 1, wherein said host-side control block issues the contents data transmission request plural times to said module-side control block, and
wherein said module-side control block sends the plurality of data portions to said host each time receiving the contents data transmission request.

3. The electronic equipment according to claim 1, wherein said module-side control information storage section stores a module-side key which instructs a processing content of the contents data,
wherein said module-side control block performs processing on the contents data based on the host-side key and the module-side key to send to said host, when receiving the contents data transmission request with the host-side key from said host, and sends the module-side key to said host when receiving a module-side key transmission request from said host, and
wherein said host-side control block sends the module-side key transmission request to said module, when receiving the contents data subjected to the processing based on the host-side key and the module-side key from said module, and then re-configures the contents data by using the host-side key and the module-side key when receiving the module-side key.

4. The electronic equipment according to claim 2, wherein when receiving contents data transmission request from said host, said module-side control block sends the plurality of data portions for the contents data to said host through said plurality of buses at a same time.

5. The electronic equipment according to claim 3, wherein the processing content instructed with the host-side key is the division of the contents data.

6. The electronic equipment according to claim 3, wherein the processing content instructed with the host-side key is encryption of the contents data,
wherein said module comprises an encrypting unit configured to encrypt the contents data, and
wherein said host comprises a decrypting unit configured to encrypt the contents data.

7. The electronic equipment according to claim 3, wherein the processing content instructed with the host-side key is division and encryption on the contents data,
wherein said module comprises an encrypting unit configured to encrypt the contents data, and
wherein said host comprises a decrypting unit configured to decrypt the encrypted contents data.

8. The electronic equipment according to claim 3, wherein the processing content instructed with the host-side key is division of the contents data, and the processing content instructed with the module-side key is division of the contents data.

9. The electronic equipment according to claim 3, wherein the processing content instructed with the host-side key is encryption of the contents data, and the processing content instructed with the module-side key is division of the contents data,
wherein said module comprises an encrypting unit configured to encrypt the contents data, and
wherein said host comprises a decrypting unit configured to decrypt the encrypted contents data.

10. The electronic equipment according to claim 3, wherein the processing content instructed with the host-side key is division and encryption of the contents data, and the processing content instructed with the module-side key is division of the contents data,
wherein said module comprises an encrypting unit configured to encrypt the contents data, and
wherein said host comprises a decrypting unit configured to decrypt the encrypted contents data.

11. The electronic equipment according to claim 3, wherein the processing content instructed with the host-side key is division of the contents data, and the processing content instructed with the module-side key is encryption of the contents data,
wherein said module comprises an encrypting unit configured to encrypt the contents data, and
wherein said host comprises a decrypting unit configured to decrypt the encrypted contents data.

12. The electronic equipment according to claim 3, wherein the processing content instructed with the host-side key is division and encryption of the contents data, and the processing content instructed with the module-side key is encryption of the contents data,
wherein said module comprises an encryption unit configured to encrypt the contents data, and
wherein said host comprises a decrypting unit configured to decrypt the encrypted contents data.

13. The electronic equipment according to claim 3, wherein the processing content instructed with the host-side key is division of the contents data, and the processing content instructed with the module-side key is division and encryption of the contents data,
wherein said module comprises a encrypting unit configured to encrypt the contents data, and
wherein said host comprises a decrypting unit configured to decrypt the encrypted contents data.

14. The electronic equipment according to claim 3, wherein the processing content instructed with the host-side key is encryption of the contents data, and the processing content instructed with the module-side key is division and encryption of the contents data,
wherein said module comprises an encryption unit configured to encrypt the contents data, and
wherein said host comprises a decrypting unit configured to decrypt the encrypted contents data.

15. The electronic equipment according to claim 3, wherein the processing content instructed with the host-side key is division and encryption of the contents data, and the processing content instructed with the module-side key is division and encryption of the contents data,
wherein said module comprises an encrypting unit configured to encrypt the contents data, and
wherein said host comprises a decrypting unit configured to decrypt the encrypted contents data.

16. An electronic equipment comprising:
a module configured as a transmission side of data;
a host configured as a reception side of the data;
a plurality of buses for data transmission between said module and said host;
a module-side contents data storage section provided in said module to store contents data for one content which needs protection;
a plurality of module-side buffers provided respectively for said plurality of buses;
a module-side control block provided in said module to send the contents data for the one content stored in said contents data storage section from either of said plurality of buffers through a corresponding one of said plurality of buses;
a host-side control information storage section provided for said host to store a host-side key which instructs a processing content of the contents data;
a module-side control information storage section provided for said module to store the host-side key; and
a host-side control block provided for said host to send a contents data transmission request and the host-side key stored in the host-side control information storage section to said module;
wherein said module-side control block is configured to store the host-side key sent with the contents data transmission request in said module-side control information storage section, and to perform processing on said contents data based on the host-side key to send to said host, and
said host-side control block is configured to receive the plurality of data portions and re-configures the contents data from the plurality of data portions by using the host-side key stored in said host-side control information storage section.

* * * * *